June 7, 1938.  B. F. RANDEL  2,119,557
PNEUMATIC TIRE
Filed April 23, 1937
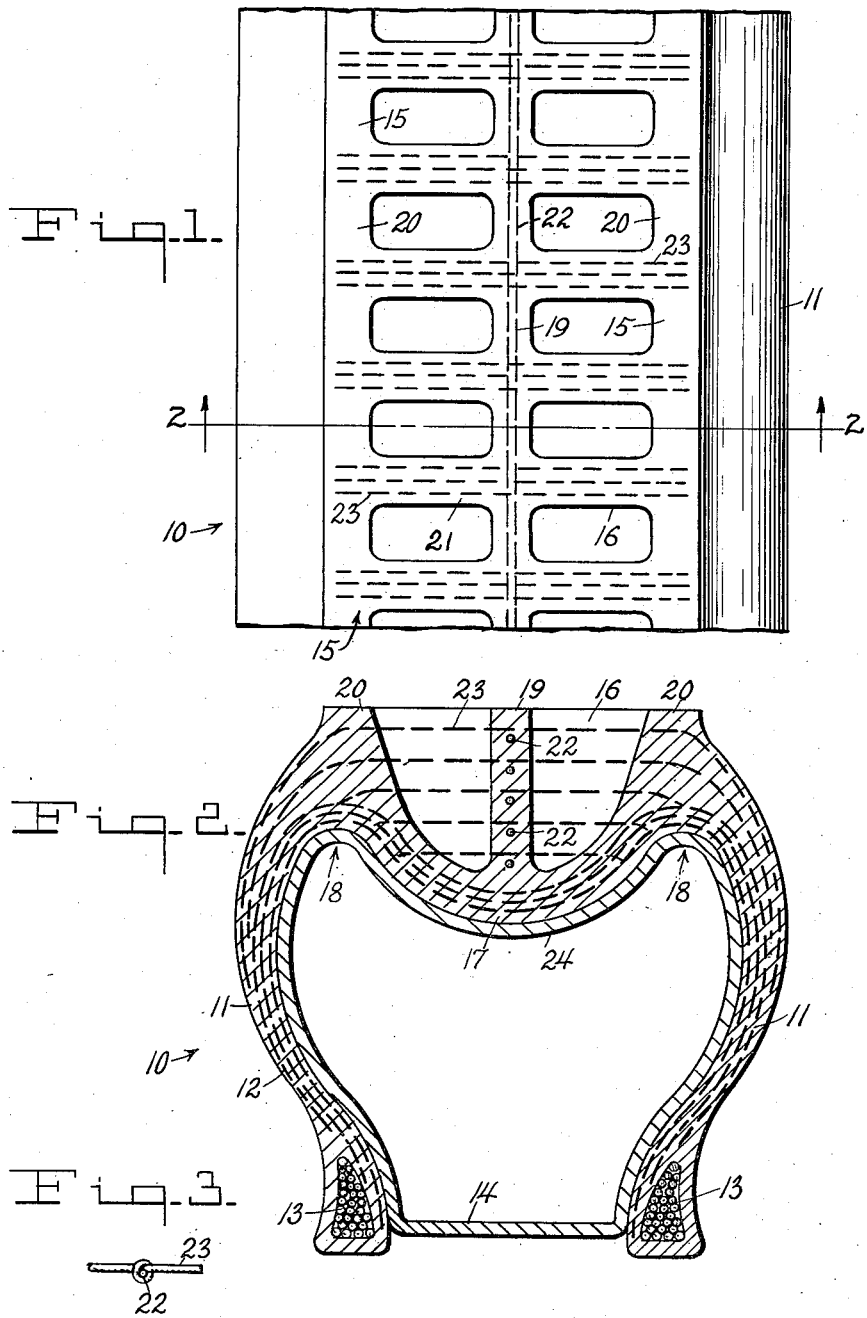
INVENTOR
Bo Folke Randel
BY
ATTORNEY Patented June 7, 1938

2,119,557

UNITED STATES PATENT OFFICE 2,119,557

PNEUMATIC TIRE

Bo Folke Randel, San Diego, Calif.

Application April 23, 1937, Serial No. 138,609

3 Claims. (Cl. 152—14)

(Granted under the act of March 3, 1883, as amended April 30, 1928; 370 O. G. 757)

This invention relates to a non-skid tire and has for an object to provide an approved tire having an extremely long non-skid life.

The usual non-skid tire has a tread surface on its periphery which is worn away at a comparatively early time and as soon as the non-skid tread surface is worn away the tire becomes smooth and non-skid-proof and is usually discarded in spite of the fact that the side walls and remainder of the tire is still in substantially perfect condition, and capable of providing a great deal more wearing surface. The usual non-skid tire is substantially circular in cross-section at its outer periphery, thereby limiting the depth of the non-skid grooves provided therein.

It is an object of this invention to increase the non-skid life of the tire by making it possible to provide extremely long lived non-skid grooves or other non-skid means on the periphery of the tire by changing the internal curvature of the periphery of the tire so that the internal contour of the tire will have a re-entrant curve instead of the conventional substantially circular curvature. With such a re-entrant curve the contour of the tire permits the provision of non-skid grooves or other non-skid means to the fullest thickness of the tire so that the non-skid means will remain until the casing of the tire itself has worn out and is ready to be discarded.

With the foregoing and other objects in view, this invention comprises the combinations, constructions and arrangements of parts set forth, disclosed and claimed in the following specification, taken in consideration with the accompanying drawing, wherein like references denote corresponding parts.

Fig. 1 is a plan view of a portion of the wearing surface of the tire;

Fig. 2 is a section view on line 2—2 of Fig. 1, and

Fig. 3 is a fragmentary view showing a cross cord tied to a longitudinal cord.

There is shown at 10 the tire of this invention having its side walls 11 of the usual construction, that is, having conventional cord or fabric reinforcements 12 therein and the usual bead 13, the pneumatic tube 14 being located within the tire 10. The treated wearing surface 15 of the tire 10 is provided with a plurality of non-skid cups or grooves 16. The casing 17 on which the wearing surface 15 is supported has a re-entrant curvature as indicated at 18, the thickness of the casing at 17 being substantially conventional.

The cups or grooves 16 are provided with a central longitudinal rib 19 and two side longitudinal ribs 20 connected by short cross ribs 21 spaced from each other. A plurality of reinforcing cords or wires 22 extend along the central longitudinal rib 19, and reinforcing cords or wires 23 extend through the short ribs 21, are tied to the central rib cords 22 as shown, and merge into the side walls 11 of the casing. As a result of thus reinforcing the sides of the deep, separated cups or grooves 16, it is impossible for them to collapse under the action of a side skid, and they thereby tend to maintain a uniform road traction throughout their exterior tread surface, which substantially tends to discourage side skidding. Furthermore, the re-entrant curvature 24, which is beneath the said deep, separated cups or grooves 16 extends upon opposite sides thereof, with the result that the lateral angles or fillets 18 at opposite ends of said re-entrant curvature 24 are directly below the outer margin of the exterior or tread surface of the ribs 20. The air pressure within the inner tube 14 in its thrust against the re-entrant curvature 24 and its opposite terminal angles or fillets 18 results in a balanced pressure of the exterior or tread surface of the ribs 20 in their road traction frictional effort, which precludes the serious fault of tires of the prior art in lateral skidding exerting their principal or sole road traction upon one of the lateral edges of the road traction surface of the tire, whereas, in my invention the road traction surface is under all circumstances maintained with uniform stressed contact with the road surface. Although the tread or wearing surface 15 just described is the preferred form of non-skid surface to be used on this invention, it will be apparent that other types of non-skid surfaces may be provided hereon with their non-skid grooves and treads greatly increased in thickness and in depth as a result of the presence of the re-entrant periphery 17.

Likewise, while the tube 14 may be of the conventional shape it is apparent that it may be especially shaped and provided with a similar re-entrant curvature 24 corresponding to the re-entrant curvature at 17. The central longitudinal rib 19 might be omitted without affecting the operation of this invention, in which case the cross ribs 21 would serve to maintain the proper contour of the tire.

As the tread surface 15 is worn away in use it will be apparent that a non-skid surface will be maintained until the casing itself is worn through substantially to the tube at the re-entrant angle 18, for the openings in the non-skid surface extend to a point below the line extending between the two re-entrant angles 18, thus insuring that the non-skid surface will last for the entire life of the tire and permitting the maximum non-skid mileage therefrom.

In the tread disclosed as an illustration of my invention, it will be noted that the extended depth of the grooves 16 allows air pressure to build up therein as the tread yields under load on hard pavement, preventing the formation of the vacuum present in the old style of vacuum cup tire. When used on muddy roads the pressure prevents the mud from filling the grooves, and serves to force out the mud immediately, when the groove is removed from the mud by the rotation of the wheel.

In my invention, the road surface of the tire comprises a large volume of compressed air in separate volumes of such dimensions that the air entrapped in each volume is maintained therein until released by the rotation of the wheel without exerting any vacuum pull upon the road surface. The large volume of air entering and leaving such separate volumes prevents the tire from heating by such air removing heat from the tire.

Furthermore, in the old vacuum cup tires the load compression of such tires caused some air to be forced from each of such cups as the load compression on each cup increases. However, as the load compression decreases by the wheel rotation a partial vacuum is formed which requires substantial power to overcome, exerts harmful effect upon the road surface, and causes objectionable noise, due to the successive breaking of the vacuum in the old vacuum cups. My invention overcomes all of these objections by permitting no partial vacuums to be formed.

According to the provisions of the patent statutes, I have set forth the principle and mode of operation of my invention and have illustrated and described what I now consider to represent its best embodiment. However, I desire to have it understood that within the scope of the appended claims the invention may be practiced otherwise than as specifically illustrated and described.

The invention herein described and claimed may be used and/or manufactured by or for the Government of the United States of America for Governmental purposes without the payment of any royalties thereon or therefor.

I claim:

1. A pneumatic tire casing comprising side walls and a tread surface, a peripheral surface connecting said side walls and supporting said tread surface, said peripheral surface having a re-entrant curvature, the edges of said peripheral surface meeting said side walls at a substantially acute angle, a line extending between the apices of the acute angles formed by the re-entrant curvature and the side walls intersecting the outer side of said peripheral surface.

2. A pneumatic tire casing comprising side walls and a tread surface, a peripheral surface connecting said side walls and supporting said tread surface, said peripheral surface having a re-entrant curvature, the edges of said peripheral surface meeting said side walls at a substantially acute angle, a line extending between the apices of the acute angles formed by the re-entrant curvature and the side walls intersecting the outer side of said peripheral surface and the non-skid wearing tread.

3. A non-skid pneumatic tire comprising side walls, a peripheral surface connecting said side walls with a re-entrant curvature and a non-skid tread supported on said peripheral surface, said non-skid wearing tread extending to a point below a line connecting the acute angles formed between the re-entrant curvature of the peripheral surface and said side walls.

BO FOLKE RANDEL.